United States Patent [19]

Persson et al.

[11] Patent Number: 5,803,616
[45] Date of Patent: Sep. 8, 1998

[54] GREASE RETAINER AND TAPER ROLLER BEARING HAVING SAME

[75] Inventors: Mats Johan Persson, Amsterdam; Nicolaas Kollaard, Montfoort, both of Netherlands

[73] Assignee: SKF Industrial Trading & Development Company B.V., Nieuwegein, Netherlands

[21] Appl. No.: 842,115

[22] Filed: Apr. 28, 1997

[30] Foreign Application Priority Data

May 14, 1996 [NL] Netherlands ............................ 1003110

[51] Int. Cl.⁶ ...................................................... F16C 33/66
[52] U.S. Cl. ........................... 384/473; 384/466; 384/475
[58] Field of Search ..................... 384/462, 463, 384/464, 465, 466, 469, 471, 473, 474, 571

[56] References Cited

U.S. PATENT DOCUMENTS

| | | | |
|---|---|---|---|
| 1,909,525 | 5/1933 | Curtis | 384/474 |
| 2,272,757 | 2/1942 | Teker | 384/466 |
| 2,628,871 | 2/1953 | Powers | 384/582 |
| 2,872,257 | 2/1959 | Brown et al. | 384/465 |
| 3,206,261 | 9/1965 | Schaefer | 384/471 |
| 3,833,277 | 9/1974 | Jones et al. | 384/459 |
| 3,885,842 | 5/1975 | Furutsu | 384/468 |
| 3,913,992 | 10/1975 | Scott et al. | 384/465 |
| 4,030,785 | 6/1977 | Robinson et al. | 384/474 |
| 4,571,097 | 2/1986 | Lee et al. | 384/469 |
| 4,669,894 | 6/1987 | Hallerback | 384/477 |
| 4,838,841 | 6/1989 | Harvey | 394/571 |
| 5,320,433 | 6/1994 | Kimata et al. | 384/473 |

FOREIGN PATENT DOCUMENTS

| | | | |
|---|---|---|---|
| A2 450 975 | 10/1980 | France . | |
| A2351197 | 5/1974 | Germany . | |
| A3315644 | 10/1984 | Germany . | |
| 6235425 | 8/1994 | Japan | 384/473 |

*Primary Examiner*—Thomas R. Hannon
*Attorney, Agent, or Firm*—Oliff & Berridge, PLC

[57] ABSTRACT

A taper roller bearing comprises an inner ring and an outer ring having tapered raceways, a bearing space in which tapered rollers are arranged, as well as a cage for mutually spacing the rollers. A grease retainer is connected to the outer ring. The grease retainer is situated next to the inner ring part having the smallest raceway diameter. The retainer comprises a ring-shaped channel in the inner space of which grease can be accommodated. The channel has apertures for communicating the channel inner space with the bearing space.

16 Claims, 1 Drawing Sheet

GREASE RETAINER AND TAPER ROLLER BEARING HAVING SAME

BACKGROUND OF THE INVENTION

The invention is related to a taper roller bearing comprising an inner ring and an outer ring having tapered raceways, enclosing a bearing space in which tapered rollers are arranged as well as a cage for mutually spacing the rollers.

Such taper roller bearings are widely known. They are able to take both radial and axial loadings. In order to obtain a smooth operation, normally an amount of grease is filled in the bearing space between the outer and the inner ring. In service, the grease is to be gradually consumed by bleeding of the oil contained in the grease, which means that after a specific service interval a new amount of grease should be added.

The specific consumption of grease is however impeded by the centrifugal forces which are exerted on the grease due to the rotational movements of the rotating ring and roller/cage set. Thereby, the grease is urged towards the largest diameter portion of the bearing space, and may finally collect in a position where it is no longer effective for lubrication purposes.

A further problem which may arise in the known bearings is the inaccurate dosing of the grease into the bearing space. After filling the grease, an amount thereof too large may reach the bearing space or roller/cage sweeping space. Under the influence of centrifugal forces it will then be transported to the larger diameter end. Also the working of the grease will lead to high bearing temperatures.

SUMMARY OF THE INVENTION

One object of the invention is to provide a taper rolling bearing which lacks these problems. This is achieved in that a grease retainer is connected to one of the rings.

The grease retainer is able to prevent the grease from migrating too quickly into the bearing space, even under the influence of shock loads and centrifugal forces as normally generated in service. In particular, the grease retainer is connected to the outer ring, next to the inner ring part having the smallest raceway diameter.

The grease retainer can be carried out in various ways; preferably, the retainer comprises a ringshaped channel in the inner space of which grease can be accommodated. The channel has apertures for communicating the channel inner space with the bearing space. Such channel may have a U-shaped cross section, the bottom of which faces outwardly towards the otter ring. The grease can be easily retained within the U-shaped channel, as the centrifugal forces will press it against the bottom thereof. The apertures ensure a gradual delivery of grease and thereby oil into the bearing space.

According to a preferred embodiment, the taper rolling bearing comprises two sets of tapered rollers. The sets are each arranged in a separate bearing space between corresponding inner and outer rings, the ring parts having the smallest raceway diameter facing each other, wherein the grease retainer is situated between the two inner rings.

In particular applications, such as train bearing units, the outer rings are carried out as a unity; in such case, the grease retainer is connected to an axially central part of the unitary outer ring. The grease retainer may here be carried out as a channel having two generally parallel flanges extending radially inwardly from the channel bottom, which flanges are provided with apertures.

The channel can be easily mounted, for instance by snap-fitting. The bottom is provided with at least one radially outwardly extending pipe stub which fits in a correspondingly shaped hole in the outer ring.

As usual, grease replenishments are applied through these holes. In practice, almost all the grease will assemble near the hole, and will initially not be spread out evenly. In order to obtain a quicker and more even distribution of the grease, the apertures in the channel flanges may have a varying size and spacing.

A further advantage of the grease retainer becomes apparent during storage and transport. Under such conditions, the grease may gradually sink to the lowest position, and almost all of it may end up between the raceways and the rolling elements. In such cases, high temperatures will develop as soon as the bearing in question is taken into service. The grease retainer prevents the formation of such undesirable grease concentrations as well.

BRIEF DESCRIPTION OF THE DRAWINGS

The invention will be explained further with reference to preferred embodiments as shown in the drawings, wherein.

DETAILED DESCRIPTION OF PREFERRED EMBODIMENTS

Figure 1:
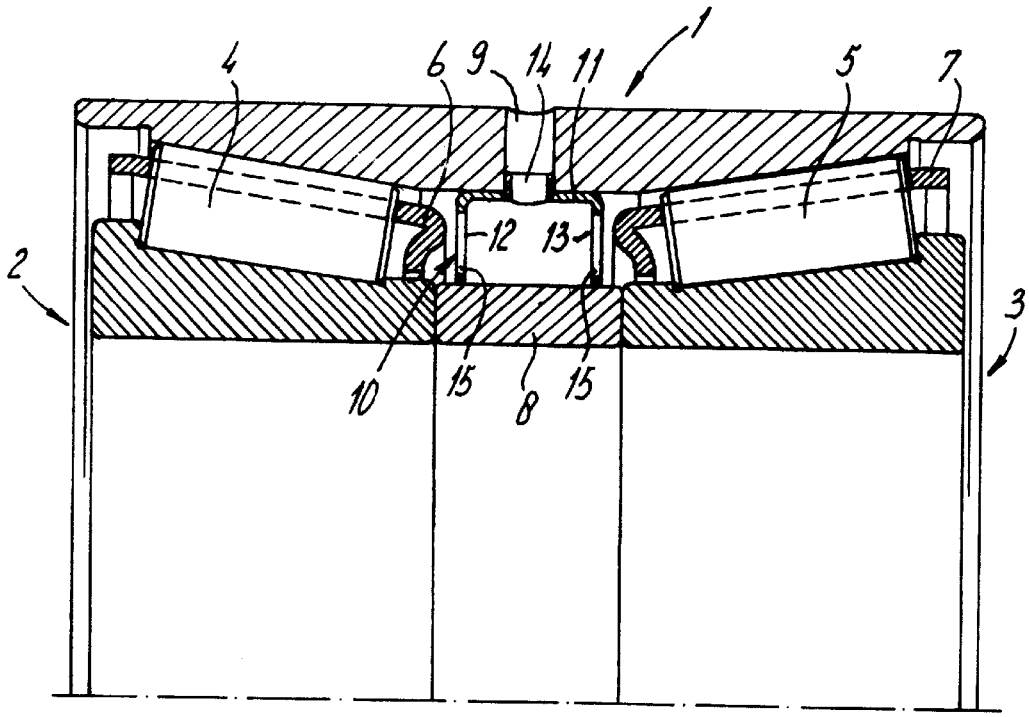
FIG. 1 shows a partial cross section of a taper rolling bearing according to the invention.

The taper rolling bearing according to FIG. 1 comprises a unitary outer ring 1, as well as two separate inner rings 2, 3. Between these rings 2, 3, two sets of rollers 4, 5 are accommodated. In each set 4, 5 the rollers are spaced apart by means of cage rings 6, 7 respectively.

The two inner rings are spaced apart by means of spacer ring 8.

A grease lubricant replenishment hole 9 has been provided in the outer ring 1.

According to the invention, a grease retaining channel 10 has been connected to the outer ring 1. This grease retainer ring 10 has a bottom 11, as well as two radially inwardly extending flanges 12, 13. The bottom 11 of the grease retaining channel 10 is provided with at least one pipe stub 14, which clickfits into grease replenishment holes 9. Between channel 10 and the opposite spacer ring 8, a small gap is available.

Figure 2:
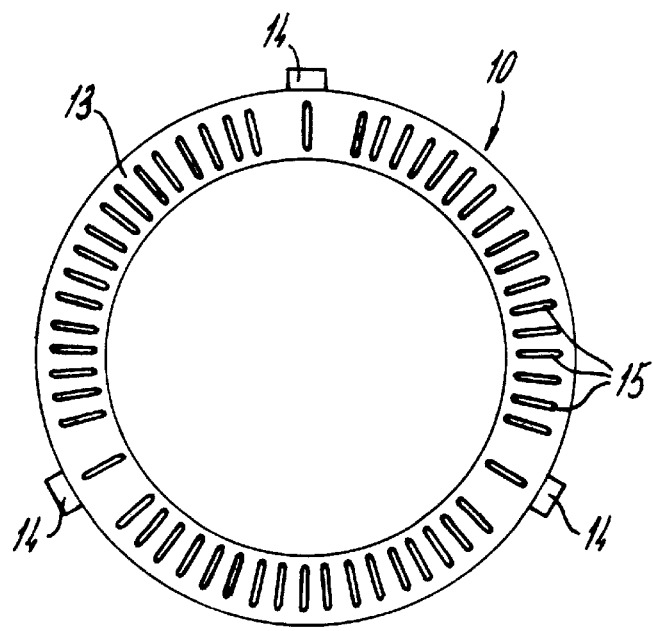
FIG. 2 shows a grease retaining channel according to the invention in sideview.

FIG. 2 shows the grease retaining channel 10, having three pipe stubs 14 which each fit in a grease lubricant replenishment hole 9 in the outer ring.

As is clear from FIGS. 1 and 2 as well, the flanges 12, 13 are provided with apertures 15, which are spaced according to a particular pattern. Near each pipe stub 14, the apertures 15 are spaced apart at a greater distance than the apertures further away from a pipe stub 14. The reason therefore is the following.

In replenishing the grease, a certain amount, e.g. 80 grams, is introduced through the outer ring 1 via grease replenishment holes 9 and pipe stub 14. In practice, a large amount of grease will then sit in the vicinity of these pipe stubs 14, without initially spreading over the full channel area.

However, the grease is more or less compelled to spread further over the channel by having only a few apertures 15 near the pipe stubs. Thereby, only a limited amount of grease can escape in the area near the pipe stubs; the remaining grease will flow further away from the pipe stubs and escape from the channel via the other apertures 15.

Thereby, an even spreading of grease over the entire circumference of the taper roller bearing is ensured. Moreover, during transport and storage the grease retainer channel prevents the grease from sinking into the bearing space, for instance when the taper rolling bearing is stored during a longer time on one side.

Figure 3:
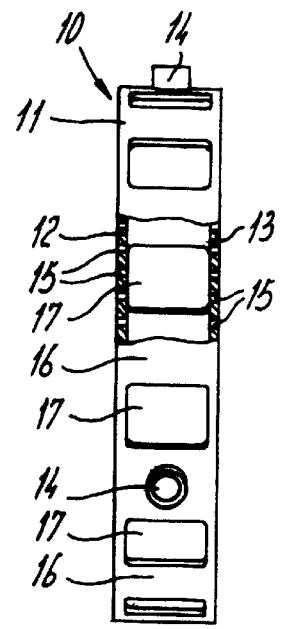
FIG. 3 shows pert of the grease retaining channel in perspective according to FIG. 2.

FIG. 3 shows that the bottom 11 of the channel 10 may comprise or consist of a number of bridges 16 and openings 17.

The channel may comprise or consist of a material such as plastic; also, metals such as aluminium or steel are possible.

What is claimed is:

1. A taper roller bearing comprising:
    an inner ring and an outer ring defining at least one tapered raceway, the tapered raceway having a small diameter portion and a large diameter portion;
    tapered rollers conveyed in a bearing space defined in the tapered raceway between the inner and outer rings;
    a cage arranged for spacing the rollers; and
    a grease retainer connected to one of the inner and outer rings, wherein the grease retainer is connected to the outer ring adjacent a portion of the inner ring having the small diameter portion of the raceway.

2. The taper roller bearing according to claim 1, wherein the grease retainer comprises a ringshaped channel defining an inner space in which grease can be accommodated, the channel having apertures for communicating the inner space with the bearing space.

3. The taper roller bearing according to claim 2, wherein the channel has U-shaped cross section, the bottom of which faces outwardly.

4. The taper roller bearing according to claim 2, wherein the channel comprises an injection molded plastic.

5. The taper roller bearing according to claim 2, wherein the tapered rollers are arranged in opposed bearing spaces such that corresponding portions of the inner and outer rings defining raceway diameters that are smallest face each other, wherein the grease retainer is situated between the corresponding inner rings.

6. The taper roller bearing according to claim 5, wherein the outer rings are formed integrally, and the grease retainer is connected to an axially central part of the integral outer ring.

7. The taper roller bearing according to claim 2, wherein the channel has two generally parallel flanges extending radially inwardly from a bottom of the channel, the flanges being provided with the apertures.

8. The taper roller bearing according to claim 7, wherein the bottom is provided with at least one radially outwardly extending pipe stub that fits in a correspondingly shaped hole in the outer ring.

9. The taper roller bearing according to claim 7, wherein the apertures in the channel flanges have variable dimensions.

10. The taper roller bearing according to claim 7, wherein the apertures in the channel flanges are spaced apart with varying mutual distances.

11. A grease retainer for taper roller bearings arranged in a bearing space, comprising:
    a ringshaped channel defining an inner space in which grease can be accommodated; and
    apertures formed in the channel for communicating the inner space with the bearing space,
    wherein the channel has two generally parallel flanges extending radially inwardly from a bottom of the channel, the flanges being provided with the apertures, and the apertures in the flanges have at least one of varying mutual distances and variable dimensions.

12. The grease retainer according to claim 11, wherein the bottom is provided with at least one radially outwardly extending pipe stub that fits in a correspondingly shaped hole in an outer ring of a roller bearing.

13. A roller bearing comprising:
    at least one set of roller bearings disposed in a bearing space between an inner ring and an outer ring; and
    a grease retainer disposed adjacent the roller bearings, the grease retainer comprising:
        a ringshaped channel defining an inner space in which grease can be accommodated,
        apertures formed in the channel for communicating to the inner space with the bearing space, and
        at least one pipe stub extending radially away from the channel into a corresponding hole in the outer ring.

14. The roller bearing according to claim 13, wherein the apertures are spaced more sparsely in a region of the channel surrounding the pipe stub than in remaining regions of the channel.

15. The roller bearing according to claim 13, wherein the apertures are unevenly spaced on the channel.

16. The roller bearing according to claim 13, wherein the bearings are taper bearings.

* * * * *